(12) United States Patent
Corey

(10) Patent No.: US 11,945,323 B2
(45) Date of Patent: Apr. 2, 2024

(54) COOPERATIVE AUTOMOTIVE MOBILE CHARGING INFRASTRUCTURE

(71) Applicant: Honda Motor Co., Ltd., Tokyo (JP)

(72) Inventor: Peter Corey, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 17/515,696

(22) Filed: Nov. 1, 2021

(65) Prior Publication Data

US 2022/0055492 A1    Feb. 24, 2022

Related U.S. Application Data

(62) Division of application No. 16/406,618, filed on May 8, 2019, now Pat. No. 11,192,463.

(51) Int. Cl.
| | | |
|---|---|---|
| *B60L 53/35* | (2019.01) | |
| *B60K 6/28* | (2007.10) | |
| *B60L 53/65* | (2019.01) | |
| *G06Q 30/0208* | (2023.01) | |

(52) U.S. Cl.
CPC ............... *B60L 53/35* (2019.02); *B60L 53/65* (2019.02); *G06Q 30/0208* (2013.01); *B60K 6/28* (2013.01); *B60L 2200/12* (2013.01); *B60L 2200/24* (2013.01); *B60Y 2200/91* (2013.01); *B60Y 2200/92* (2013.01); *B60Y 2300/91* (2013.01)

(58) Field of Classification Search
CPC ...... B60L 53/35; B60L 53/65; B60L 2200/12; B60L 2200/24; G06Q 30/0208; B60K 6/28; B60Y 2200/91; B60Y 2200/92; B60Y 2300/91

USPC .......................................................... 320/104
See application file for complete search history.

(56) References Cited

U.S. PATENT DOCUMENTS

| | | | |
|---|---|---|---|
| 6,037,746 A |  | 3/2000 | Sheng et al. |
| 9,545,853 B1 | * | 1/2017 | Penilla .................. H02J 7/00 |
| 10,093,194 B2 | * | 10/2018 | Hyde .................... B60L 53/39 |
| 10,183,586 B1 | * | 1/2019 | Appelbaum .......... H02J 7/0013 |
| 10,192,245 B2 | * | 1/2019 | Khoo .................... B60L 53/305 |
| 10,942,036 B2 | * | 3/2021 | Mizutani ............. G01C 21/3438 |

(Continued)

FOREIGN PATENT DOCUMENTS

| | | | | |
|---|---|---|---|---|
| AT | 508489 A1 | * | 1/2011 | .......... B60L 11/1818 |
| CN | 205256146 U | | 6/2016 | |

(Continued)

*Primary Examiner* — Suresh Memula
(74) *Attorney, Agent, or Firm* — Plumsea Law Group, LLC

(57) ABSTRACT

A method and system for providing a cooperative automotive mobile charging infrastructure are described. In one embodiment, a method for providing a cooperative automotive mobile charging infrastructure includes receiving a notification indicating an availability for providing mobile charging to electric personal transport devices. Each notification includes an identification of an electrified vehicle to provide the mobile charging and a location of the electrified vehicle. The method includes receiving a request for mobile charging from a user and determining a candidate electrified vehicle that is available to provide mobile charging to the user. The method also includes providing the location of the candidate electrified vehicle to the user to provide mobile charging at the location to an electric personal transport device associated with the user.

19 Claims, 8 Drawing Sheets

(56) References Cited

U.S. PATENT DOCUMENTS

| | | | |
|---|---|---|---|
| 2009/0085522 A1* | 4/2009 | Matsumoto | B60L 53/60 320/137 |
| 2011/0202418 A1* | 8/2011 | Kempton | B60L 53/64 705/26.1 |
| 2012/0200151 A1* | 8/2012 | Obayashi | B60L 50/61 307/104 |
| 2012/0249065 A1* | 10/2012 | Bissonette | B60L 53/665 320/109 |
| 2012/0271758 A1* | 10/2012 | Jammer | G07F 15/003 701/22 |
| 2013/0035823 A1* | 2/2013 | Yoshida | G07C 5/085 701/302 |
| 2013/0204471 A1* | 8/2013 | O'Connell | B60L 53/68 701/22 |
| 2014/0188318 A1* | 7/2014 | Langgood | G06F 17/00 701/22 |
| 2014/0312841 A1* | 10/2014 | Baba | H02J 3/38 320/109 |
| 2015/0042272 A1* | 2/2015 | Nakadai | H02J 50/90 320/108 |
| 2015/0091503 A1* | 4/2015 | Hyde | B60L 53/64 320/108 |
| 2015/0171659 A1* | 6/2015 | Lee | H02J 50/10 320/108 |
| 2015/0191093 A1* | 7/2015 | Yamamaru | B60L 53/16 320/109 |
| 2015/0217656 A1* | 8/2015 | Loftus | B60L 1/006 320/136 |
| 2015/0329002 A1* | 11/2015 | Broecker | B60L 53/65 320/109 |
| 2016/0031517 A1 | 2/2016 | Neugebauer et al. | |
| 2016/0288664 A1 | 10/2016 | Biagini et al. | |
| 2017/0219366 A1 | 8/2017 | Aich et al. | |
| 2017/0225578 A1* | 8/2017 | Paryani | B60L 53/36 |
| 2018/0101926 A1* | 4/2018 | Ortiz | H02J 7/342 |
| 2018/0105054 A1 | 4/2018 | Fan et al. | |
| 2018/0229613 A1* | 8/2018 | Rajaie | B60L 53/16 |
| 2018/0241234 A1 | 8/2018 | Liang et al. | |
| 2018/0260838 A1* | 9/2018 | New | G06Q 30/0239 |
| 2018/0264955 A1* | 9/2018 | Gupta | G06Q 30/0283 |
| 2019/0311630 A1* | 10/2019 | VanderZanden | G01C 21/3438 |
| 2019/0351783 A1* | 11/2019 | Goei | B60L 53/67 |
| 2019/0366862 A1* | 12/2019 | Anton | B60L 53/51 |
| 2020/0140256 A1* | 5/2020 | Setchell | G07F 13/025 |
| 2020/0262305 A1* | 8/2020 | Chakraborty | B60L 53/57 |
| 2020/0361329 A1* | 11/2020 | Schütz | B60L 53/53 |
| 2020/0376969 A1* | 12/2020 | Shorten | B60L 53/12 |
| 2022/0122213 A1* | 4/2022 | Ortiz | G06Q 10/20 |

FOREIGN PATENT DOCUMENTS

| | | | | |
|---|---|---|---|---|
| DE | 102014018111 A1 | | 6/2015 | |
| DE | 202017003622 U1 | * | 11/2017 | |
| EP | 1174976 A1 | | 1/2012 | |
| EP | 3147153 A1 | * | 3/2017 | |
| EP | 3386070 A1 | | 10/2018 | |
| KR | 20110130732 A | | 12/2011 | |
| KR | 20190027556 A | * | 3/2019 | |
| WO | WO-2013019336 A1 | * | 2/2013 | B60L 1/003 |
| WO | 2017204797 A1 | | 11/2017 | |
| WO | 2017209736 A1 | | 12/2017 | |
| WO | WO-2018188819 A1 | * | 10/2018 | B60L 53/305 |
| WO | 2019026095 A1 | | 2/2019 | |
| WO | WO-2019215423 A1 | * | 11/2019 | B60L 53/14 |

\* cited by examiner

COOPERATIVE AUTOMOTIVE MOBILE CHARGING INFRASTRUCTURE

CROSS-REFERENCE TO RELATED APPLICATION

This application is a division of U.S. patent application Ser. No. 16/406,618, filed on May 8, 2019 and titled "Cooperative Automotive Mobile Charging Infrastructure," the disclosures of which application is incorporated by reference herein in its entirety.

BACKGROUND

The embodiments relate generally to electrified vehicles, and in particular to a method and system for providing a cooperative automotive mobile charging infrastructure.

As electrified vehicles become more common, the electric charging infrastructure to support charging of these electrified vehicles is also growing and expanding. In addition to these electrified vehicles, in many areas, small, battery-powered electric transportation devices, such as electric scooters and electric bicycles, are also becoming increasingly common. These small electric transportation devices may allow users to quickly move about within a city or other areas. The existing electric charging infrastructure, however, may not be available to owners or users of small electric transportation devices to charge these devices. As a result, a significant expenditure of resources may be needed to gather these electric transportation devices from different parts of the city for charging so that they are ready and available for other users.

SUMMARY

The techniques of the present embodiments described herein provide a method and system for providing a cooperative automotive mobile charging infrastructure that allows owners or users of electrified vehicles to provide charging to electric personal transport devices.

In one aspect, a method for providing a cooperative automotive mobile charging infrastructure is provided, the method including: receiving a notification indicating an availability for providing mobile charging to electric personal transport devices, wherein each notification has at least an identification of an electrified vehicle to provide the mobile charging and a location of the electrified vehicle; receiving a request for mobile charging from a user; determining, for each request, a candidate electrified vehicle that is available to provide mobile charging to the user; and providing the location of the candidate electrified vehicle to the user, wherein the candidate electrified vehicle provides mobile charging at the location to an electric personal transport device associated with the user.

In another aspect, a system for providing a cooperative automotive mobile charging infrastructure is provided, the system including: a mobile charging service provider; at least one electrified vehicle; and at least one electric personal transport devices associated with one or more users; wherein the mobile charging service provider is configured to: receive a notification indicating an availability for providing mobile charging to electric personal transport devices, wherein the notification includes at least an identification of an electrified vehicle to provide the mobile charging and a location of the electrified vehicle; receive a request for mobile charging from at least one of the one or more users; determine, for each request, a candidate electrified vehicle that is available to provide mobile charging to a user of the one or more users; and provide the location of the candidate electrified vehicle to the user, wherein the candidate electrified vehicle provides mobile charging at the location to an electric personal transport device associated with the user.

In another aspect, an electrified vehicle for providing mobile charging to an electric personal transport device is provided, the electrified vehicle including: at least one auxiliary charging port in communication with a battery or electrical system of the electrified vehicle; at least one charging cable that connects to the at least one auxiliary charging port; and wherein the electrified vehicle provides mobile charging to an electric personal transport device at a stationary location by connecting the at least one charging cable to the at least one auxiliary charging port of the electrified vehicle to a charging port of the electric personal transport device.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments may be better understood with reference to the following drawings and description. The components in the figures are not necessarily to scale. Moreover, in the figures, like reference numerals designate corresponding parts throughout the different views.

DETAILED DESCRIPTION

The example embodiments described herein provide a method and system for providing a cooperative automotive mobile charging infrastructure. The techniques described herein allow owners or users of electrified vehicles to provide mobile charging to electric personal transport devices. Coordination of the mobile charging between the owners/users of the electrified vehicles and the owners/users of the electric personal transport devices is provided by a mobile charging service provider.

Figure 1:
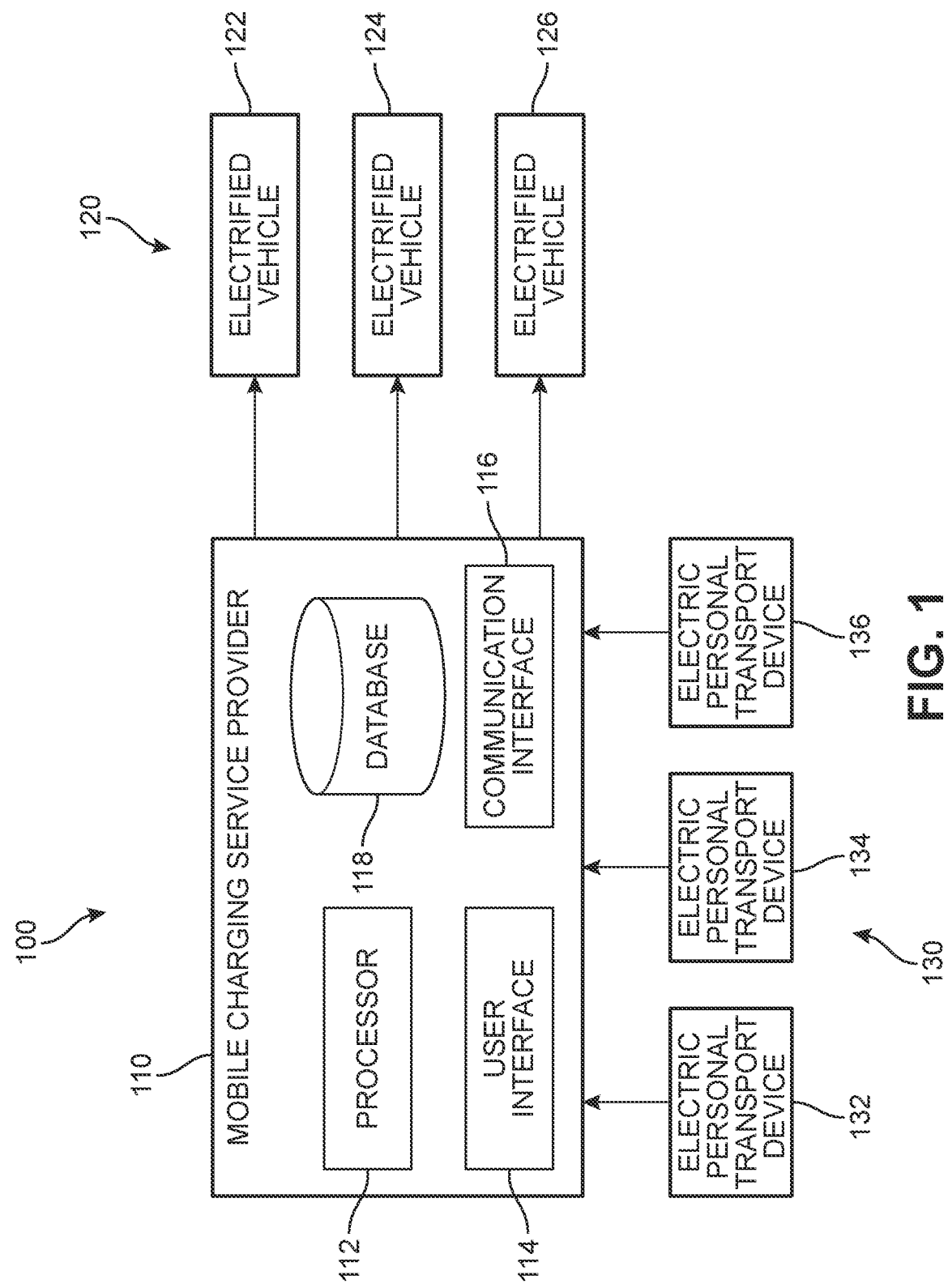
FIG. 1 is a schematic view of an example embodiment of a system for providing a cooperative automotive mobile charging infrastructure.

FIG. 1 illustrates a schematic diagram of an embodiment of a system 100 for providing a cooperative automotive mobile charging infrastructure. In an example embodiment, system 100 may include a mobile charging service provider 110, a plurality of electrified vehicles 120, and a plurality of electric personal transport devices 130. Mobile charging service provider 110 may include hardware, software, and components that are configured to communicate with owners or users of plurality of electrified vehicles 120 and owners or users of plurality of electric personal transport devices 130.

In an example embodiment, owners or users of plurality of electrified vehicles 120 and/or plurality of electric personal transport devices 130 may elect to participate in the cooperative automotive mobile charging infrastructure. For example, mobile charging service provider 110 may provide support for the cooperative automotive mobile charging infrastructure by signing up users who are interested in offering their electrified vehicles to provide mobile charging, users who are interested in obtaining mobile charging for their electric personal transport devices, or users who may participate as both.

In this embodiment, mobile charging service provider 110 may include a processor 112 that is in communication with at least a user interface 114, a communication interface 116, and a database 118. In some embodiments, mobile charging service provider 110 may include other components not shown in FIG. 1 to facilitate receiving notifications or requests from users, determining locations or areas associated with users of the mobile charging infrastructure, and providing information to the users to allow owners or users of electrified vehicles to provide mobile charging to electric personal transport devices according to the example embodiments described herein.

In some embodiments, user interface 114 may be configured to allow one or more owners or users of plurality of electrified vehicles 120 and/or plurality of electric personal transport devices 130 to interact with mobile charging service provider 110. For example, in one embodiment, user interface 114 may interact with owners or users of plurality of electrified vehicles 120 and/or plurality of electric personal transport devices 130 through an application (e.g., mobile app) or website. Users of the mobile charging infrastructure may sign up with mobile charging service provider 110 through user interface 114. In some embodiments, user interface 114 may interact with the one or more users of the mobile charging infrastructure via a connection with a wired or wireless telecommunication network available through communication interface 116.

Communication interface 116 may be configured to allow mobile charging service provider 110 to communicate with one or more vehicles of plurality of electrified vehicles 120, as well as to permit mobile charging service provider 110 to send and/or receive messages or alerts to users of the cooperative automotive mobile charging infrastructure. For example, in one embodiment, communication interface 116 may be a wireless transceiver that transmits and/or receives signals (e.g., commands, messages, information, etc.) to and/or from one or more vehicles of plurality of electrified vehicles 120 or users of plurality of electrified vehicles 120 and/or plurality of electric personal transport devices 130.

In this embodiment, plurality of electrified vehicles 120 may include a first electrified vehicle 122, a second electrified vehicle 124, and a third electrified vehicle 126, and plurality of electric personal transport devices 130 includes a first electric personal transport device 132, a second electric personal transport device 134, and a third electric personal transport device 136. Electrified vehicles may include an electric vehicle powered by a battery or fuel cell (i.e., a battery electric vehicle (BEV) or fuel cell vehicle (FCV)) as well as a hybrid electric vehicle powered by an electric motor, generator, or battery in addition to an internal combustion engine (i.e., a hybrid electric vehicle (HEV) or plug-in hybrid electric vehicle (PHEV)). Additionally, electric personal transport devices may include any battery-powered personal transportation device, including, but not limited to: electric scooters, electric bicycles or e-bikes, electric-assisted mopeds, electric skateboards, electric unicycles, or other small electric-powered mobility transporters.

FIG. 1 illustrates three electrified vehicles and three electric personal transport devices for the purpose of explanation, however, it should be understood that the cooperative automotive mobile charging infrastructure according to the present embodiments may include any number of electrified vehicles and/or electric personal transport devices.

In some embodiments, database 118 may include information associated with plurality of electrified vehicles 120 and plurality of electric personal transport devices 130. For example, database 118 may store information associated with the identities and/or locations of one or more of plurality of electrified vehicles 120, including first electrified vehicle 122, second electrified vehicle 124, and/or third electrified vehicle 126, and locations of one or more of plurality of electric personal transport devices 130, including first electric personal transport device 132, second electric personal transport device 134, and/or third electric personal transport device 136.

Database 118 may also include information about owners or users of plurality of electrified vehicles 120 and/or owners or users of plurality of electric personal transport devices 130. For example, database 118 may store account information, usernames or other identification, preferences, electrified vehicles or electric personal transport devices associated with a particular user, as well as any incentives, credits, or promotions available to users of the cooperative automotive mobile charging infrastructure. Database 118 may also include other information that may be used by mobile charging service provider 110.

Figure 2:
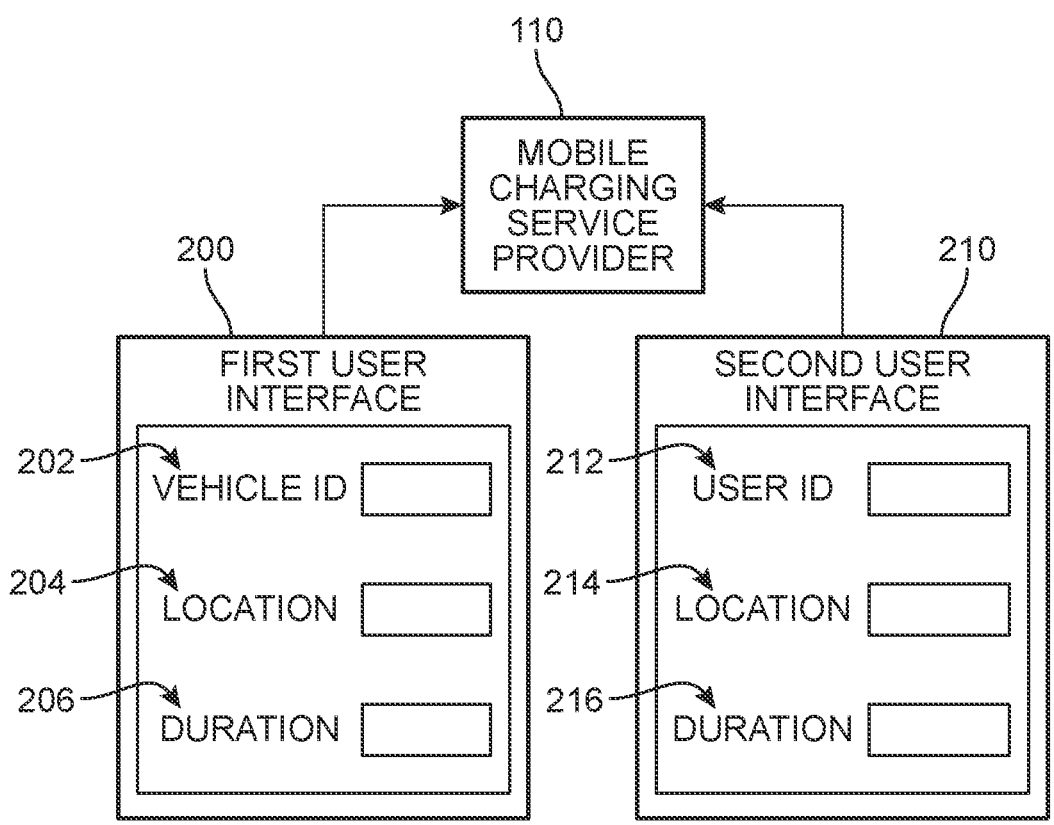
FIG. 2 is a schematic view of an example embodiment of user interfaces for a cooperative automotive mobile charging infrastructure.

Referring now to FIG. 2, an example embodiment of user interfaces for users of the cooperative automotive mobile charging infrastructure is shown. As described above, in some embodiments, a user (e.g., one or more owners or users of plurality of electrified vehicles 120 and/or plurality of electric personal transport devices 130) may interact with user interface 114 at mobile charging service provider 110, which may be a mobile app or website. In an example embodiment, a first user interface 200 is provided for owners or users of plurality of electrified vehicles 120 to interact with mobile charging service provider 110 and a second user interface 210 is provided for owners or users of plurality of electric personal transport devices 130 to interact with mobile charging service provider 110. That is, first user interface 200 and second user interface 210 may be different depending on whether the user is offering mobile charging or is requesting mobile charging.

In an example embodiment, first user interface 200 may be provided on a first user-side (e.g., owners or users of plurality of electrified vehicles 120) to allow the user to provide information to user interface 114 of mobile charging service provider 110. For example, first user interface 200 may be provided through a user's mobile telephone, tablet, computer, in-vehicle system, or other device to allow the user to enter relevant information associated with a notification to mobile charging service provider 110 indicating an availability to provide mobile charging to electric personal transport device.

In this embodiment, first user interface 200 may include a number of fields to obtain information from the user about the notification indicating an availability to provide mobile charging. For example, as shown in FIG. 2, first user interface 200 may include a vehicle ID field 202 for information associated with an identification of the user's electrified vehicle that is to provide the mobile charging. For example, information that may be provided in vehicle ID field 202 may include a license plate number, a vehicle identification number (VIN), or other identifier to uniquely distinguish the user's electrified vehicle.

First user interface 200 may also include a location field 204 for information associated with a stationary location of the user's electrified vehicle that is to provide the mobile charging. For example, information that may be provided in location field 204 may include a street address or intersection, global positioning system (GPS) coordinates, or other information associated with a parking space, a charging station, or a roadside area that may assist with finding the location of the user's electrified vehicle. First user interface 200 may also include a duration field 206 for information associated with a time period or duration that the user's electrified vehicle is available at that location to provide mobile charging. For example, in some embodiments, a user may only be at a given location for a limited amount of time (e.g., 30 minutes, an hour, two hours, etc.) and, therefore, the user's electrified vehicle is only available to provide mobile charging for a limited duration. In other embodiments, appointments or other information from a user's calendar, for example, a calendar on the same device as first user interface 200, may be used to automatically determine a time period or duration.

In an example embodiment, second user interface 210 may be provided on a second user-side (e.g., owners or users of plurality of electric personal transport devices 130) to allow the user to provide information to user interface 114 of mobile charging service provider 110. For example, second user interface 210 may be provided through a user's mobile telephone, tablet, computer, or other device to allow the user to enter relevant information associated with a request to mobile charging service provider 110 for mobile charging of the user's electric personal transport device.

In this embodiment, second user interface 210 may include a number of fields to obtain information from the user about the request for mobile charging. For example, as shown in FIG. 2, second user interface 210 may include a user ID field 212 for information associated with an identification of the user that is requesting mobile charging. For example, information that may be provided in user ID field 212 may include a username, membership number or ID, or other identifier to uniquely distinguish the requesting user.

Second user interface 210 may also include a location field 214 for information associated with a location of the user's request for mobile charging. For example, information that may be provided in location field 214 may include a street address or intersection, GPS coordinates, a zip code, city and state, distance or proximity to the user's current location, or other information that may assist with finding an available electrified vehicle for mobile charging. Second user interface 210 may also include a duration field 216 for information associated with a time period or duration for which the user is requesting mobile charging to be available.

For example, in some embodiments, a user may request mobile charging for different amounts of time or time periods (e.g., 30 minutes, an hour, two hours, etc.) to assist with finding suitable electrified vehicles that are available to provide mobile charging for the requested amount of time.

Each field in first user interface 200 and/or second user interface 210 may include a corresponding data entry area so that the user may enter the requested information. In some embodiments, the data entry area may be in the form of a drop down menu populated with predefined selections or other optional selection mechanism. Once the user has provided the information requested in fields 202, 204, 206 via first user interface 200 or fields 212, 214, 216 via second user interface 210, the information may be provided to mobile charging service provider 110. For example, as described above, mobile charging service provider 110 may receive the notification or request sent by users from first user interface 200 and/or second user interface 210 via user interface 114. Additionally, first user interface 200 and/or second user interface 210 may include other fields for other information that the user provides to mobile charging service provider 110 about the notification or request.

Figure 3:
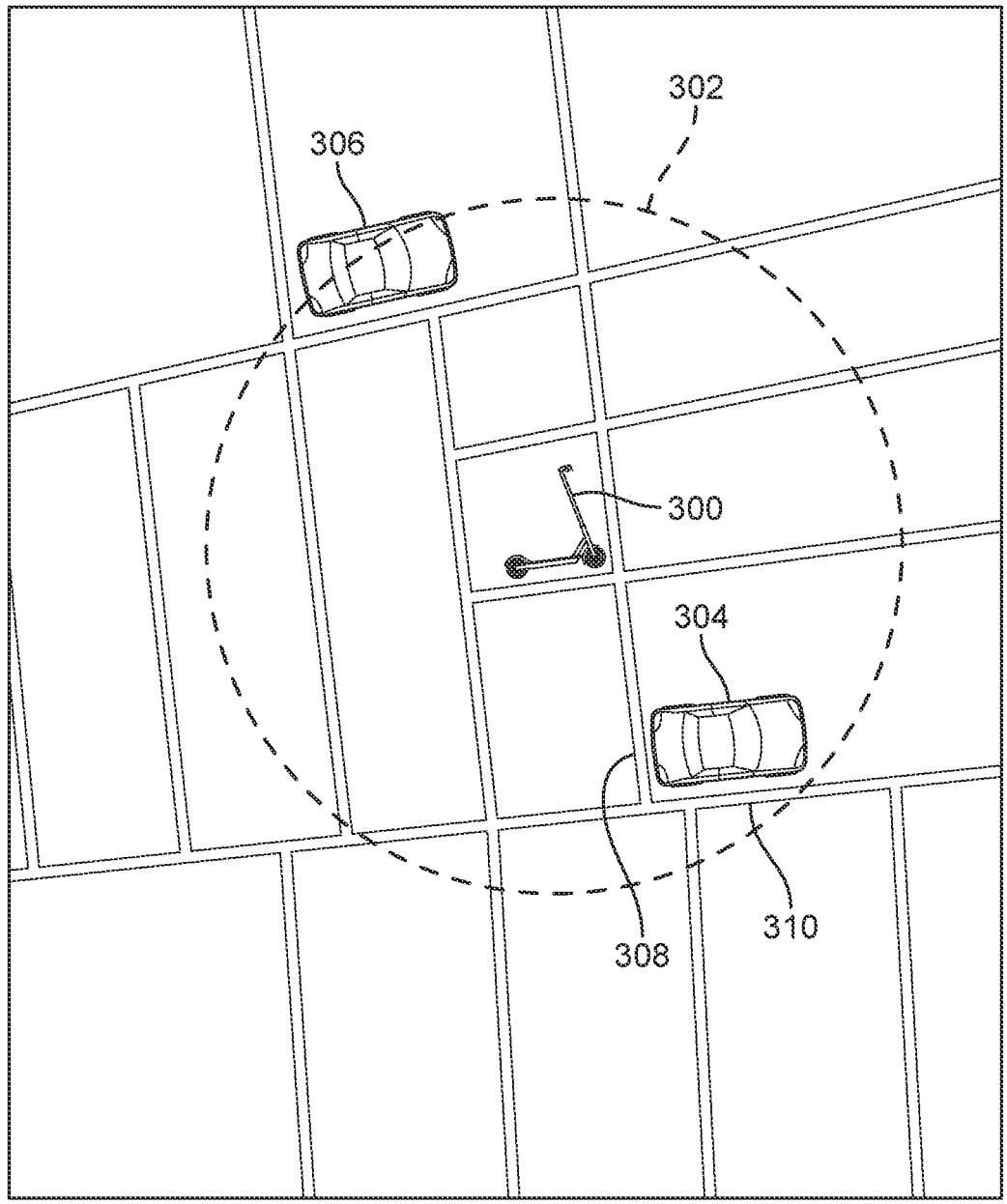
FIG. 3 is a representative view of an electric personal transport device requesting a charge from a cooperative automotive mobile charging infrastructure.

Based on the information received at mobile charging service provider 110 from users of plurality of electrified vehicles 120 and/or plurality of electric personal transport devices 130, mobile charging service provider 110 may determine at least one candidate electrified vehicle that is available to provide mobile charging to a user of an electric personal transport device to fulfil that user's request for mobile charging. Referring now to FIG. 3, an example embodiment of an electric personal transport device 300 requesting a charge from a cooperative automotive mobile charging infrastructure is illustrated.

As shown in FIG. 3, a user of electric personal transport device 300 may send a request to mobile charging service provider 110 indicating that the user is looking for mobile charging within a predetermined distance 302 of the user's current location. In this embodiment, there are two candidate electrified vehicles within the same general vicinity or area as electric personal transport device 300 that are within the predetermined distance 302, including a first candidate electrified vehicle 304 and a second candidate electrified vehicle 306. It should be understood that two candidate electrified vehicles are shown in FIG. 3, but any number of candidate electrified vehicles may be within a predetermined distance from the user. In some embodiments, a user may select the predetermined distance 302 so as to increase or decrease the number of candidate electrified vehicles that are returned to the user as being available.

Based on the request from the user of electric personal transport device 300, mobile charging service provider 110 may provide the location of one or more of the candidate electrified vehicles that fulfil the user's request for mobile charging. As shown in FIG. 3, mobile charging service provider 110 may provide the location of either or both of first candidate electrified vehicle 304 and/or second candidate electrified vehicle 306 to the user of electric personal transport device 300 in response to the request for mobile charging.

For example, mobile charging service provider 110 may provide the location of first candidate electrified vehicle 304 to the user of electric personal transport device 300 as being parked in a parking space at the intersection of $2^{nd}$ Street 308 and Parkview Avenue 310. In some embodiments, mobile charging service provider 110 may also provide identifying information to the user of electric personal transport device 300 to assist the user with identifying first candidate electrified vehicle 304 that is to provide the mobile charging to electric personal transport device 300. For example, the identifying information may be any of the information provided by the user of first candidate electrified vehicle 304 in vehicle ID field 202 of first user interface 200.

Figure 4:
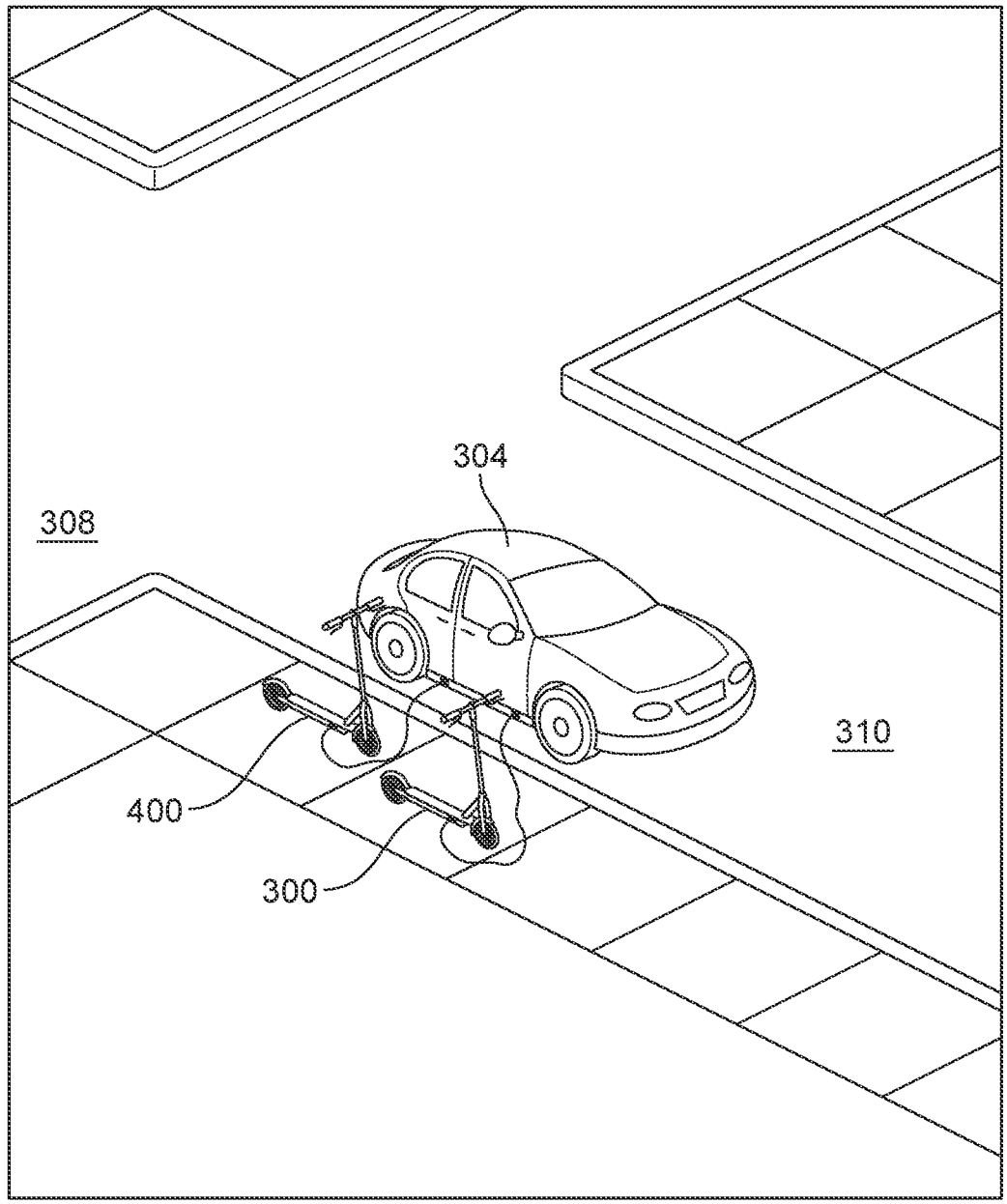
FIG. 4 is a representative view of an example embodiment of a method for providing a cooperative automotive mobile charging infrastructure.

Referring now to FIG. 4, an example embodiment of a method for providing a cooperative automotive mobile charging infrastructure is illustrated. In the embodiment shown in FIG. 4, the user of electric personal transport device 300 has requested mobile charging from mobile charging service provider 110 and has been provided with the location of first candidate electrified vehicle 304 that is available to provide mobile charging. The user of electric personal transport device 300 has traveled to the provided location (e.g., a parking space at the intersection of $2^{nd}$ Street 308 and Parkview Avenue 310) where first candidate electrified vehicle 304 is currently located.

In this embodiment, first candidate electrified vehicle 304 is shown providing mobile charging to electric personal transport device 300. For example, charging may be provided by first candidate electrified vehicle 304 to electric personal transport device 300 via cable that connects the electrical system or battery of first candidate electrified vehicle 304 with the electrical system or battery of electric personal transport device 300. In some embodiments, an electrified vehicle may provide mobile charging to more than one electric personal transport device at a time. For example, as shown in FIG. 4, another electric personal transport device 400 may also be connected to first candidate electrified vehicle 304 for mobile charging.

Figure 5:
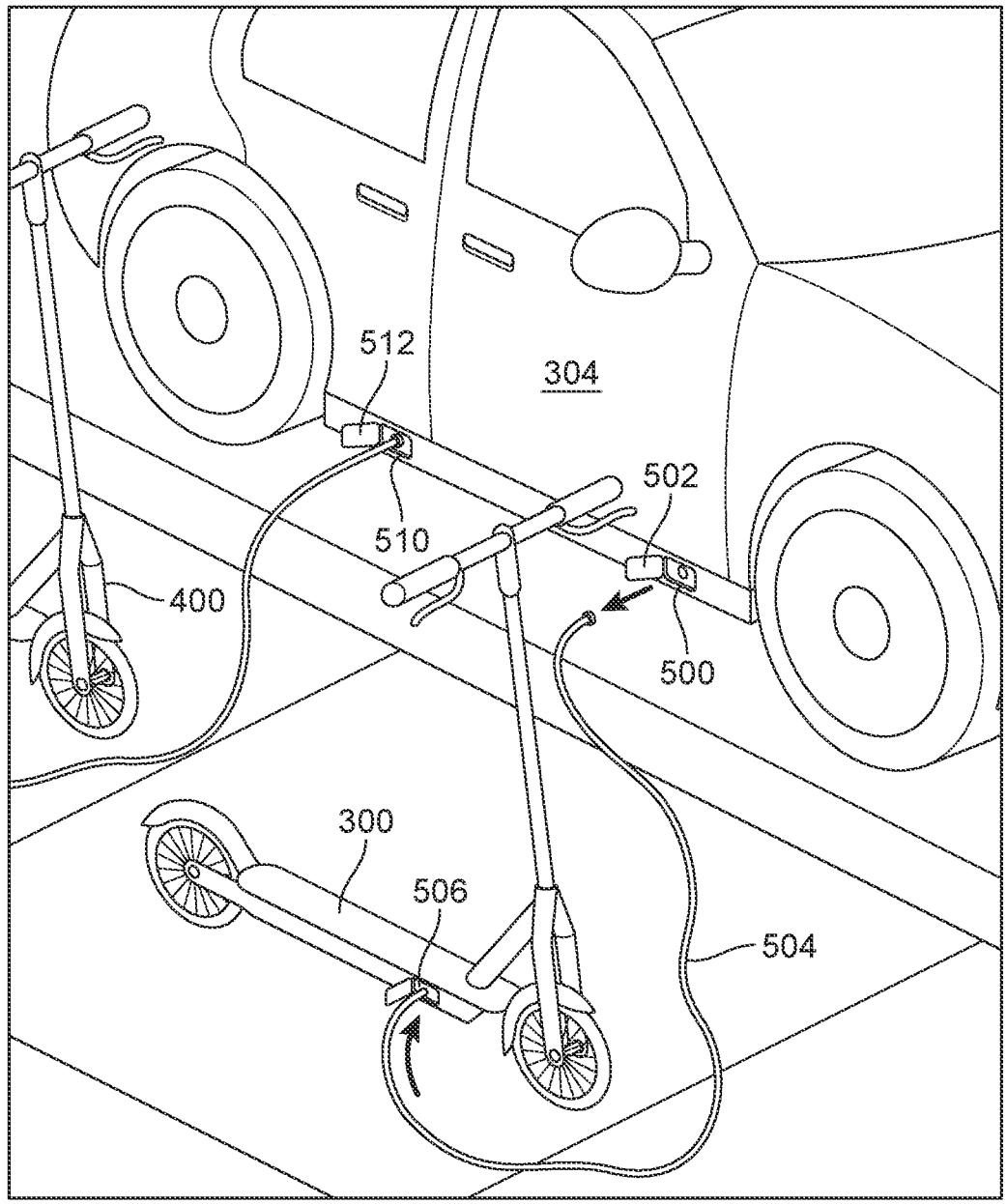
FIG. 5 is an enlarged view of an example embodiment of an electrified vehicle providing mobile charging to an electric personal transport device.

FIG. 5 is an enlarged view of an example embodiment of an electrified vehicle providing mobile charging to electric personal transport devices. In this embodiment, first candidate electrified vehicle 304 may provide mobile charging to electric personal transport device 300 and another electric personal transport device 400. In an example embodiment, an electrified vehicle may include one or more auxiliary charging ports that are configured to provide mobile charging to the electric personal transport devices. For example, as shown in FIG. 5, first candidate electrified vehicle 304 may include a first auxiliary charging port 500 and a second auxiliary charging port 510 along a side of the vehicle (e.g., integrated within the rocker panels in this embodiment) that are configured to provide mobile charging to electric personal transport device 300 and another electric personal transport device 400. In an example embodiment, the auxiliary charging ports of the electrified vehicle may be covered while not in use to protect and/or prevent access to the ports. For example, a first cover 502 may be provided for first auxiliary charging port 500 and a second cover 512 may be provided for second auxiliary charging port 510.

In some embodiments, a charging cable may be used to connect the electrical system or battery of first candidate electrified vehicle 304 with the electrical system or battery of the electric personal transport devices that are being charged via the auxiliary charging ports. In this embodiment, electric personal transport device 300 is shown with a charging cable 504 that is connected to a charging port 506 of electric personal transport device 300 at one end, and which was also connected to first auxiliary charging port 500 of first candidate electrified vehicle 304 at the other end. With this arrangement, mobile charging may be provided by an electrified vehicle to an electric personal transport device.

In some embodiments, the charging cable may be integrated into the electric personal transport device. For example, charging cable 504 may be connected to charging port 506 of electric personal transport device 300 via a retractable reel or other mechanism to automatically retract and wind up charging cable 504 when it is not in use.

Additionally, in some embodiments, the charging cable may be configured to automatically detach from the electrified vehicle and retract into the electric personal transport device upon termination or completion of charging. For example, the owner or user of first candidate electrified vehicle 304 may notify mobile charging service provider 110 that the user is returning to first candidate electrified vehicle 304 and mobile charging should end. In some other cases, mobile charging may end upon detection that the owner or user of first candidate electrified vehicle 304 is approaching the vehicle (e.g., based on detecting a phone or other device is within a certain distance of the vehicle). In still other cases, upon determining that a power level of first candidate electrified vehicle 304 is below a threshold, charging to electric personal transport device 300 may be terminated.

For example, in some embodiments, the threshold may be a certain percentage of remaining charge (e.g., 10%, 20%, 30%, etc.) that may be predetermined or may be selectable and/or modifiable by the owner or user of the electrified vehicle. In addition, in some embodiments, information regarding the remaining available charge of the electrified vehicle may be provided to the user, for example, via first user interface 200, so that the user may determine how much charge to allow for mobile charging of electric personal transport devices.

Accordingly, in these situations or when charging has completed, first candidate electrified vehicle 304 may automatically disconnect charging cable 504 from first auxiliary charging port 500, for example, using a mechanical or magnetic mechanism, and charging cable 504 will automatically retract back into the body of electric personal transport device 300. Charging cable 504 may also be manually disconnected by the user of first candidate electrified vehicle 304 and/or the user of electric personal transport device 300.

In different embodiments, one or more auxiliary charging ports on an electrified vehicle may be located on or at various places or portions of the electrified vehicle to facilitate ease of access to mobile charging for electric personal transport devices. For example, as shown in FIG. 5, first auxiliary charging port 500 and second auxiliary charging port 510 may be located along a side of first candidate electrified vehicle 304 (e.g., integrated within the rocker panels). Auxiliary charging ports may be additionally or alternatively located elsewhere on the electrified vehicle, including, but not limited to at the front bumper, rear bumper, at or near the trunk or hood of the electrified vehicle, or any other location that provides access to an auxiliary charging port to a user of an electric personal transport device.

Figure 6:
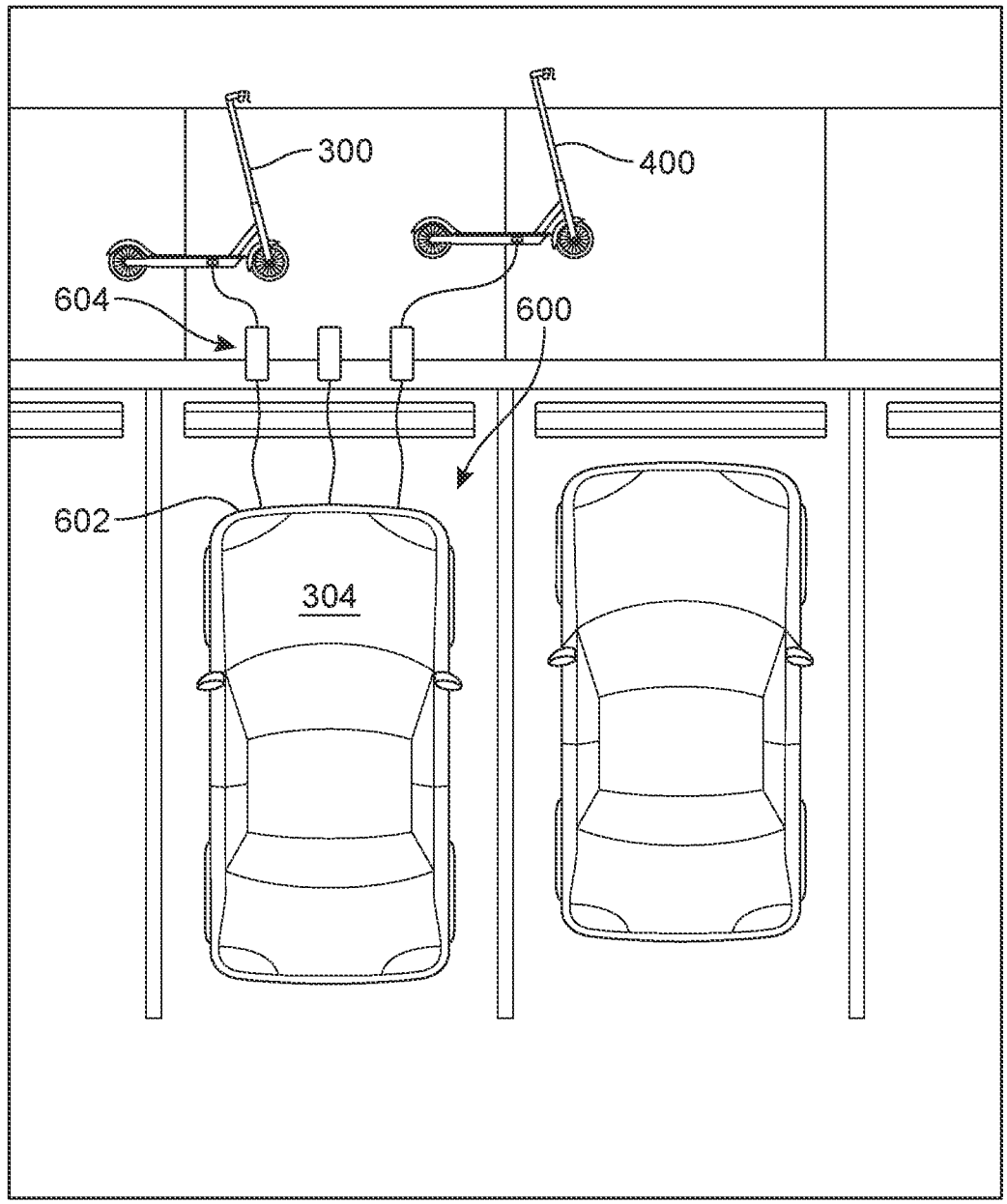
FIG. 6 is a schematic view of an alternate embodiment of an electrified vehicle providing mobile charging to a plurality of electric personal transport devices.

Additionally, in an alternate embodiment, one or more auxiliary charging ports may be provided as separate external components that are connected to the electrified vehicle but are not directly integrated into the vehicle itself. Referring now to FIG. 6, an alternate embodiment of auxiliary charging ports for an electrified vehicle providing mobile charging to a plurality of electric personal transport devices is shown.

In this embodiment, first candidate electrified vehicle 304 may be parked in a parking space 600 with a front end 602 of first candidate electrified vehicle 304 facing towards a sidewalk or other accessible area. With first candidate electrified vehicle 304 parked in parking space 600 in this manner, auxiliary charging ports 500, 510 along the sides of first candidate electrified vehicle 304 (as shown in FIG. 5 above) would not be easily accessible to a user of an electric personal transport device for mobile charging.

In this alternate embodiment, a plurality of auxiliary charging ports 604 extend out from front end 602 of first candidate electrified vehicle 304 onto the sidewalk or other accessible area in front of the vehicle. In this case, plurality of auxiliary charging ports 604 are separate external components that are connected to first candidate electrified vehicle 304 and provide mobile charging to one or more electric personal transport devices. For example, as shown in FIG. 6, plurality of auxiliary charging ports 604 may provide mobile charging to electric personal transport device 300 and another electric personal transport device 400 in front of first candidate electrified vehicle 304.

Figure 7:
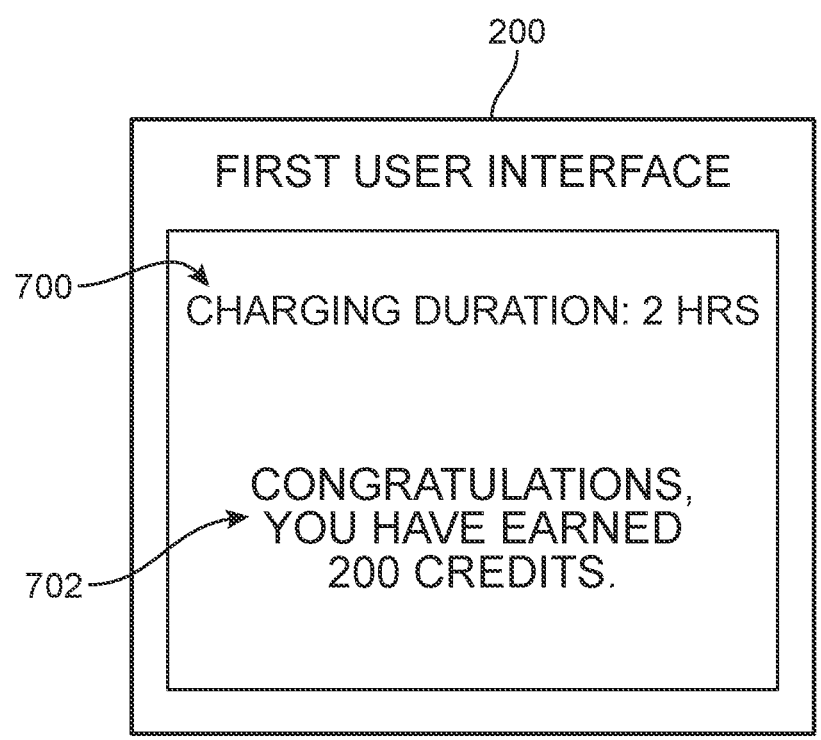
FIG. 7 is a schematic view of an example embodiment of an incentive provided to a user of a cooperative automotive mobile charging infrastructure.

In some embodiments, various types or forms of incentives, credits, and/or promotions may be made available to users of the cooperative automotive mobile charging infrastructure to encourage participation. FIG. 7 is a schematic view of an example embodiment of an incentive provided to a user of the cooperative automotive mobile charging infrastructure. In this embodiment, first user interface 200 associated with an owner or user of an electrified vehicle (e.g., an owner or user of one of plurality of electrified vehicles 120) is shown. As described above, mobile charging service provider 110 may provide various types or forms of incentives, credits, and/or promotions to encourage users to participate in the cooperative automotive mobile charging infrastructure. In particular, owners or users of plurality of electrified vehicles 120 may be incentivized to offer their electrified vehicles to provide mobile charging to one or more electric personal transport devices.

As shown in FIG. 7, upon completion of mobile charging, a user of one of plurality of electrified vehicles 120 may receive a notification on first user interface 200 from mobile charging service provider 110 informing the user of the incentives received in exchange for providing the mobile charging. In this embodiment, the notification may include a charging duration field 700 that has information about the time period or duration that the mobile charging was provided by the user's electrified vehicle. For example, as shown in this embodiment, the user provided two hours of mobile charging to another user's electric personal transport device.

Additionally, the notification from mobile charging service provider 110 may also include an incentive field 702 that includes information about the incentive earned or provided to the user of the electrified vehicle. In this embodiment, incentive field 702 notifies the user that they have received 200 credits in exchange for providing the two hours of mobile charging to another user's electric personal transport device. In different embodiments, the incentives may include one or more of discounts, credits, rewards, and/or free parking provided to the user providing the mobile charging. In some cases, a user may be both an owner/user of an electrified vehicle as well as an owner/user of an electric personal transport device. In such cases, the earned credits may be used by the user to request and receive mobile charging from another user's electrified vehicle on another occasion.

It should be understood that incentives may take a variety of different forms and may include partnerships with third parties or other vendors that are approved or authorized by mobile charging service provider 110. In addition, in some embodiments, owners or users of electric personal transport devices may be similarly incentivized to participate in the cooperative automotive mobile charging infrastructure. For example, users may receive discounted rates for renting electric personal transport devices upon completion of charging the electric personal transport device. In this manner, the cooperative automotive mobile charging infrastructure may help reduce the costs with providing charging services to plurality of electric personal transport devices 130.

Figure 8:
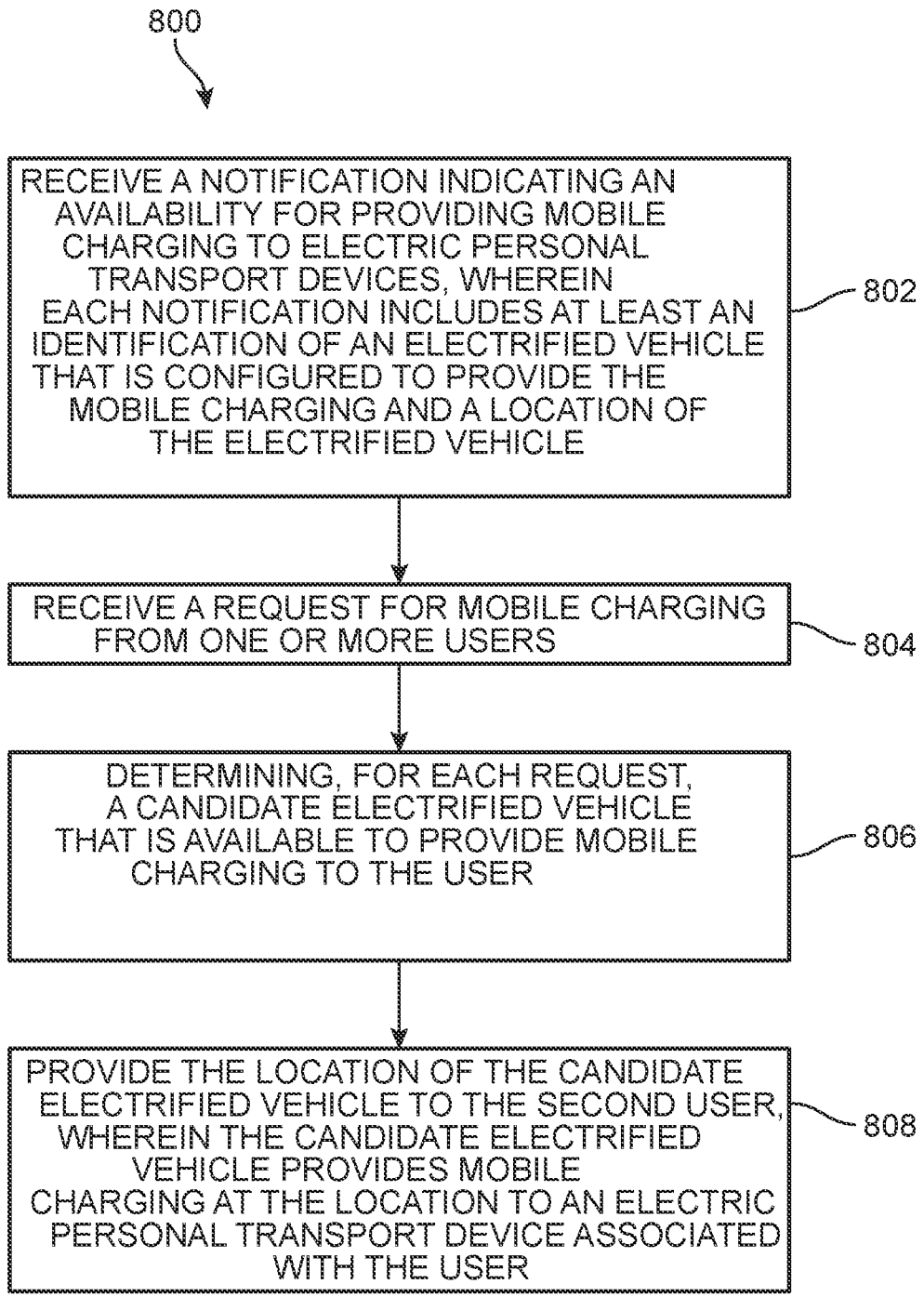
FIG. 8 is a flowchart of an example embodiment of a method for providing a cooperative automotive mobile charging infrastructure.

Referring now to FIG. 8, a flowchart of an example embodiment of a method 800 for providing a cooperative automotive mobile charging infrastructure is illustrated. In an example embodiment, method 800 may be implemented by mobile charging service provider 110, described above. As shown in FIG. 8, method 800 begins at an operation 802, where a notification is received from one or more first users indicating an availability for providing mobile charging to electric personal transport devices. Each notification received includes at least an identification of an electrified vehicle associated with the first user that is configured to provide the mobile charging and a location of the electrified vehicle.

For example, at operation 802, a first user of one of plurality of electrified vehicles 120 may provide a notification to mobile charging service provider 110 that the first user's electrified vehicle is available to provide charging to electric personal transport devices. Additionally, at operation 802, the first user may provide vehicle identification and location information using first user interface 200, as described above in reference to FIG. 2.

Next, method 800 may include an operation 804. At operation 804, a request may be received for mobile charging from one or more second users. For example, the one or more second users may be owners or users of one of plurality of electric personal transport devices 130 and the request may be sent to mobile charging service provider 110 for mobile charging using second user interface 210, as described above in reference to FIG. 2.

Method 800 may also include an operation 806. At operation 806, for each request, at least one candidate electrified vehicle associated with a user of the one or more first users that is available to provide mobile charging to the second user is determined. For example, mobile charging service provider 110 may use the location information provided by the first user (e.g., an owner or user of one of plurality of electrified vehicles 120) to determine candidate electrified vehicles that are within a predetermined distance from the location of the user of the electric personal transport device that is requesting mobile charging (i.e., based on the user's location that may be provided using second user interface 210, as described above in reference to FIG. 2).

Next, method 800 may include an operation 808 where the location of the at least one candidate electrified vehicle, determined at operation 806, is provided to the requesting second user. The candidate electrified vehicle is configured to provide mobile charging at the location to an electric personal transport device associated with the second user. For example, as shown in FIG. 3, mobile charging service provider 110 may provide the location of either or both of first candidate electrified vehicle 304 and/or second candidate electrified vehicle 306 to the user of electric personal transport device 300 in response to the request for mobile charging. The user of electric personal transport device 300 may then go to the provided location (e.g., a parking space at the intersection of $2^{nd}$ Street 308 and Parkview Avenue 310) where first candidate electrified vehicle 304 is currently located to receive mobile charging.

Method 800 may end upon sending or providing the location of the at least one candidate electrified vehicle to the requesting second user. In other embodiments, method 800 may be implemented again for a new or additional request from the same or different users. In addition, in some embodiments, method 800 may include one or more additional or optional operations. For example, in some cases, method 800 may include an operation where a notification is received from the user that the user has finished or completed mobile charging.

In some embodiments, a service provider (e.g., mobile charging service provider 110) may be a third party contractor or other entity that cooperates with owners or users of electrified vehicles (e.g., plurality of electrified vehicles 120) and/or owners or users of electric personal transport devices (e.g., plurality of electric personal transport devices 130).

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

The invention claimed is:

1. An electrified vehicle for providing mobile charging to an electric personal transport device, the electrified vehicle including:
   at least one auxiliary charging port in communication with a battery or electrical system of the electrified vehicle;
   at least one charging cable that connects to the at least one auxiliary charging port; and
   wherein the electrified vehicle is configured to provide mobile charging to an electric personal transport device at a stationary location when the at least one charging cable is connected to the at least one auxiliary charging port of the electrified vehicle and to a charging port of the electric personal transport device; and
   wherein, upon determining that an owner of the electrified vehicle is approaching the electrified vehicle while the electric personal transport device is charging, the electrified vehicle is configured to automatically end charging to the electric personal transport device.

2. The electrified vehicle according to claim 1, wherein the stationary location is at least one of a parking space, a charging station, or a roadside area.

3. The electrified vehicle according to claim 1, wherein the electrified vehicle is an electric vehicle or a hybrid vehicle.

4. The electrified vehicle according to claim 1, wherein the electric personal transport device is an electric scooter, an electric bicycle, or an electric skateboard.

5. The electrified vehicle according to claim 1, wherein the electrified vehicle is configured to provide mobile charging at the stationary location to two or more electric personal transport devices.

6. The electrified vehicle according to claim 1, wherein the at least one auxiliary charging port is located along a side of the electrified vehicle.

7. The electrified vehicle according to claim 6, wherein the at least one auxiliary charging port is integrated within a rocker panel of the electrified vehicle.

8. The electrified vehicle according to claim 1, wherein the at least one auxiliary charging port is located at a front bumper of the electrified vehicle.

9. The electrified vehicle according to claim 1, wherein the at least one auxiliary charging port is a separate external component from the electrified vehicle.

10. The electrified vehicle according to claim 1, wherein the at least one charging cable automatically disconnects from the electrified vehicle upon completion of mobile charging of the electric personal transport device.

11. The electrified vehicle according to claim 1, wherein determining that the owner of the electrified vehicle is approaching the electrified vehicle while the electric personal transport device is charging is based on detecting a phone associated with the owner within a certain distance of the electrified vehicle.

12. A system for providing a cooperative automotive mobile charging infrastructure, the system comprising:
   a plurality of electrified vehicles, wherein each electrified vehicle of the plurality of electrified vehicles comprises at least one auxiliary charging port in communication with a battery or electrical system of the electrified vehicle and at least one charging cable that connects to the at least one auxiliary charging port;
   a plurality of electric personal transport devices associated with one or more users; and
   a mobile charging service provider, wherein the mobile charging service provider is configured to:
      receive a notification sent from a user of one electrified vehicle of the plurality of electrified vehicles through a first user interface, the notification indicating an availability for providing mobile charging to one or more electric personal transport devices of the plurality of electric personal transport devices, wherein the notification includes at least: (1) an identification of the one electrified vehicle to provide the mobile charging, (2) a location of the one electrified vehicle, and (3) a time period that the one electrified vehicle will remain at the location;
      receive a request for mobile charging sent from a user of an electric transport device of the one or more users of the plurality of electric personal transport devices through a second user interface that is different from the first user interface, wherein the request includes at least: (1) a predetermined distance from a current location of the user of the electric personal transport device, and (2) a time period for which the user of the electric personal transport device is requesting mobile charging;
      determine, for the request, a candidate electrified vehicle of the plurality of electrified vehicles that is available to provide mobile charging to the user of the electric personal transport device within the predetermined distance from the current location and for the time period included in the request; and
      provide the location of the candidate electrified vehicle to the user of the electric personal transport device, wherein the candidate electrified vehicle provides mobile charging at the location to the electric personal transport device by connecting the at least one auxiliary charging port of the electrified vehicle to a charging port of the electric personal transport device via the at least one charging cable.

13. The system according to claim 12, wherein the candidate electrified vehicle is configured to provide mobile charging at the location to two or more electric personal transport devices of the plurality of electric personal transport devices.

14. The system according to claim 12, wherein the at least one auxiliary charging port is located along a side of the candidate electrified vehicle.

15. The system according to claim 12, wherein the at least one auxiliary charging port is a separate external component from the candidate electrified vehicle.

16. The system according to claim 12, wherein the at least one charging cable automatically disconnects from the candidate electrified vehicle upon completion of mobile charging of the electric personal transport device.

17. The system according to claim 16, wherein the at least one charging cable retracts into the electric personal transport device once disconnected.

18. The system according to claim 12, wherein, upon determining that an owner of the candidate electrified vehicle is approaching the candidate electrified vehicle while the electric personal transport device is charging, the candidate electrified vehicle is configured to automatically end charging to the electric personal transport device.

19. The system according to claim 18, wherein determining that the owner of the candidate electrified vehicle is approaching the candidate electrified vehicle while the electric personal transport device is charging is based on detecting a phone associated with the owner within a certain distance of the candidate electrified vehicle.

* * * * *